(12) United States Patent
Mahnken

(10) Patent No.: US 6,431,088 B2
(45) Date of Patent: Aug. 13, 2002

(54) LOAD DROP PLATFORM FOR DAMPING LOADS DURING A LOAD DROP

(75) Inventor: Norbert Mahnken, Kolbermoor (DE)

(73) Assignee: EADS Deutschland GmbH, Munich (DE)

(*) Notice: Subject to any disclaimer, the term of this patent is extended or adjusted under 35 U.S.C. 154(b) by 0 days.

(21) Appl. No.: 09/792,051

(22) Filed: Feb. 26, 2001

(30) Foreign Application Priority Data

Feb. 25, 2000 (DE) .......................... 100 08 915

(51) Int. Cl.⁷ .............................. B65D 19/38
(52) U.S. Cl. ................................ 108/57.12
(58) Field of Search ................ 108/51.4, 57.12, 108/55.1, 54.1; 244/142

(56) References Cited

U.S. PATENT DOCUMENTS

| 3,015,470 A | * | 1/1962 | Patchen |
| 3,276,530 A | * | 10/1966 | Borneman |
| 3,351,027 A | * | 11/1967 | Ellard, Jr. et al. |
| 3,440,976 A | * | 4/1969 | Burne |
| 4,095,769 A | * | 6/1978 | Fengels .................. 108/54.1 |
| 5,105,746 A | * | 4/1992 | Reynolds ................. 108/56.1 |

FOREIGN PATENT DOCUMENTS

| DE | 1431268 | 5/1964 |
| DE | 1953413 | 10/1969 |
| DE | 2358893 | 6/1975 |
| DE | 3024551 | 1/1982 |
| FR | 1230569 | 9/1960 |
| GB | 790844 | 2/1958 |

OTHER PUBLICATIONS

A copy of German office action dated Nov. 9, 2000.

* cited by examiner

Primary Examiner—Jose V. Chen
(74) Attorney, Agent, or Firm—Crowell & Moring LLP

(57) ABSTRACT

A load depositing platform for damping impact forces exerted on a load during a parachute drop has an upper plate that is connected with at least one parachute and a lower plate. The upper plate and the lower plate are connected with one another by means of a scissor-type linkage, and by at least one damper element having a woven-fabric shell which defines an interior air space therein, so that relative motion of the two plates toward each other causes a compression of air space. The damper element has a passage ring, which has at least one air passage hole therein which permits a regulated flow of air into and out of the interior air space.

12 Claims, 6 Drawing Sheets

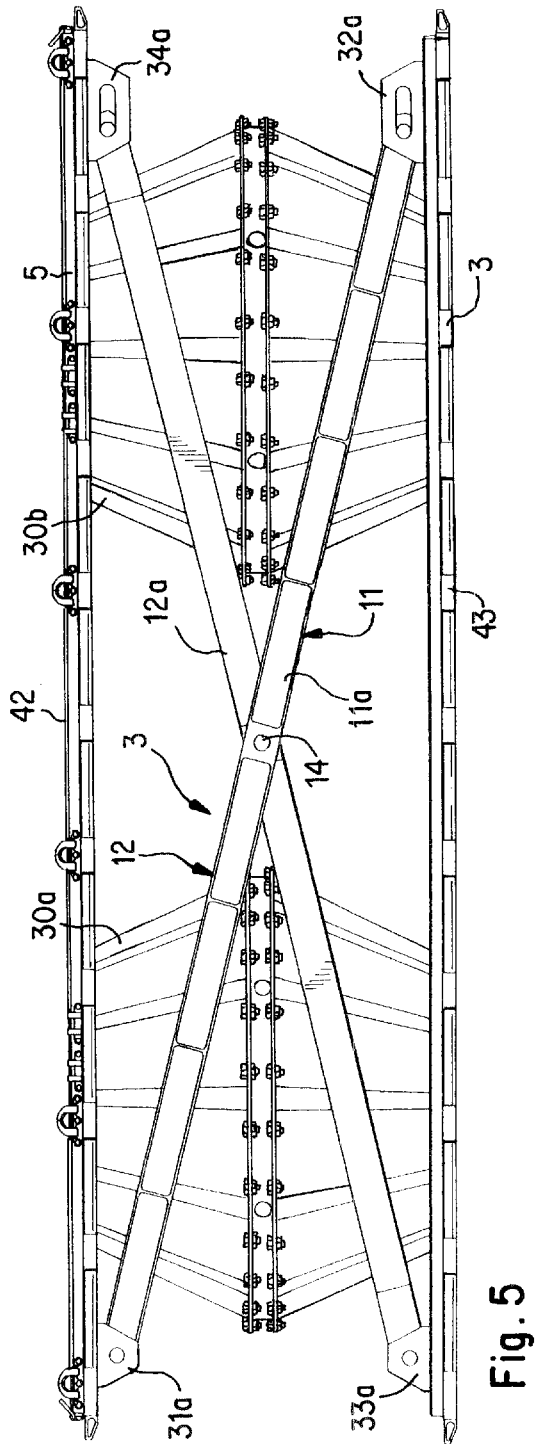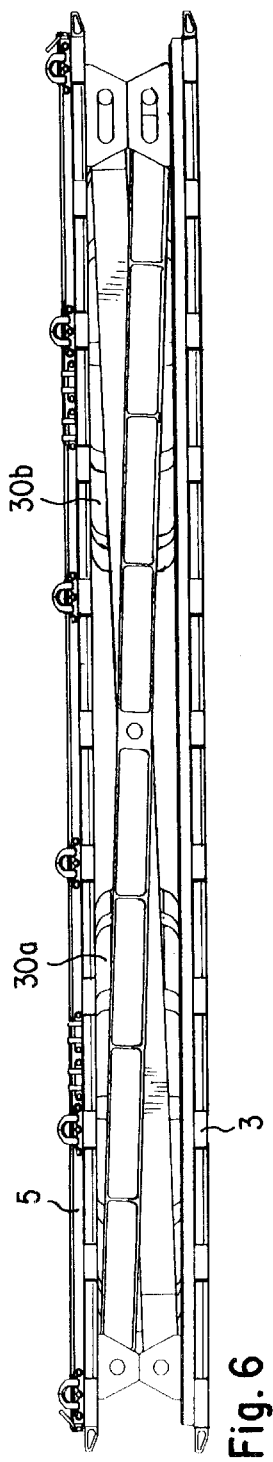

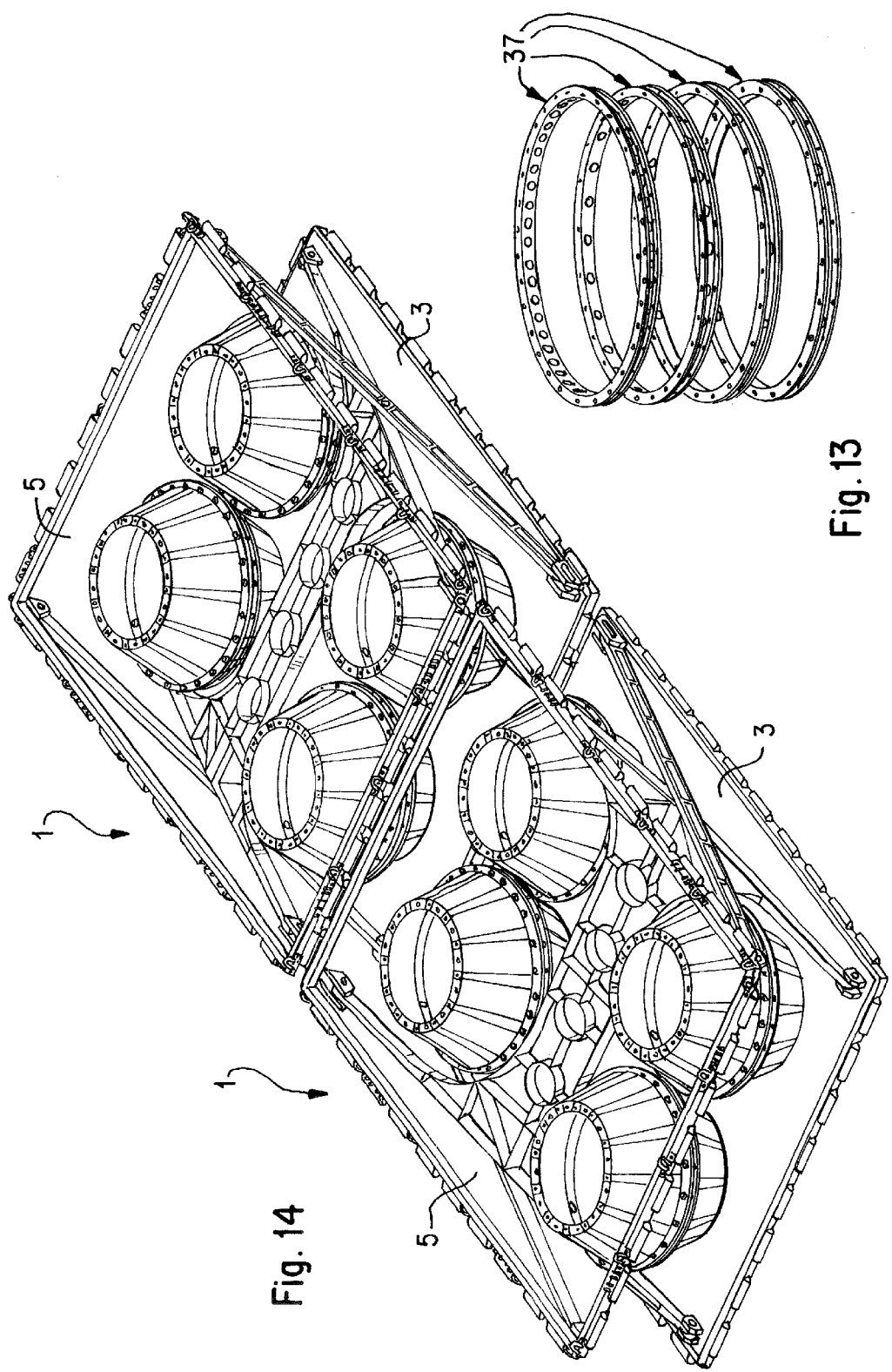

LOAD DROP PLATFORM FOR DAMPING LOADS DURING A LOAD DROP

BACKGROUND AND SUMMARY OF THE INVENTION

This application claims the priority of German patent document 100 08 915.1, filed Feb. 25, 2000, the disclosure of which is expressly incorporated by reference herein.

The invention relates to a load drop platform for damping impact forces exerted on a load during a parachute drop from an aircraft.

Known load drop platforms of this type have a plate to which the load to be dropped (for example, a land vehicle) is securely clamped, and a plurality of damping elements is fitted between the load and the plate. During the impact of the plate with the load, the damping element are irreversibly compressed because of the weight and the inertia force.

One disadvantage of such known load drop platforms is that, at points at which the load rests on the plate, the damping elements must be mechanically locked in place between the plate and the load in order to absorb directly the forces acting at the time of the impact of the load drop platform on the ground, and to prevent the load from having unfavorable clearance of motion on the plate. Another disadvantage is that the damping elements cannot be reused. In addition, it is also a disadvantage that the achievable damping depends on the shape of the load to be mounted on the plate. As a result, the achieved damping during the impact of the pallet on the ground cannot be predicted sufficiently precisely, so that unnecessarily high damping expenditures are required to ensure sufficient safety.

One object of the invention is to provide a single, reusable load drop platform for damping loads during a load drop.

This and other objects and advantages are achieved by the load drop platform according to the invention, which has a damping mechanism that ensures that sensitive loads can also land without being damaged. The load drop platform can be easily manipulated after the landing, so that the load can easily be removed from the platform. It is another advantage that the load depositing platform according to the invention can be reused.

The load drop platform according to the invention has an upper plate that is connected with at least one parachute and a lower plate. The upper plate and the lower plate are connected with one another by means of a scissor-type linkage, and by at least one damper element having a woven-fabric shell which defines an interior air space therein, so that relative motion of the two plates toward each other causes a compression of the air space. The damper element has a passage ring, which has at least one air passage hole therein which permits a regulated flow of air into and out of the interior air space.

Other objects, advantages and novel features of the present invention will become apparent from the following detailed description of the invention when considered in conjunction with the accompanying drawings.

BRIEF DESCRIPTION OF THE DRAWINGS

FIG. 5 is a lateral view (Y-direction) of the load depositing platform of FIG. 1 in its extended condition, with the first embodiment of damping elements;

FIG. 6 is a view of the load depositing platform in the representation of FIG. 5 in its retracted condition;

FIG. 13 is a view of variants of the air passage ring which is used in the damping elements according to the invention; and FIG. 14 is a view of a combination of two load depositing platforms according to the invention for depositing larger loads.

DETAILED DESCRIPTION OF THE DRAWINGS

The load depositing platform 1 according to the invention illustrated in FIGS. 1 to 6 is carried by a parachute system from the time of its drop from the aircraft (thus also after a first flight phase) until it touches down on the ground. The parachute system can be a self-controlling or remote-controlled paraglider system or a round cap system with one or several parachutes. Such a parachute system is not shown in the figures.

Figure 1:
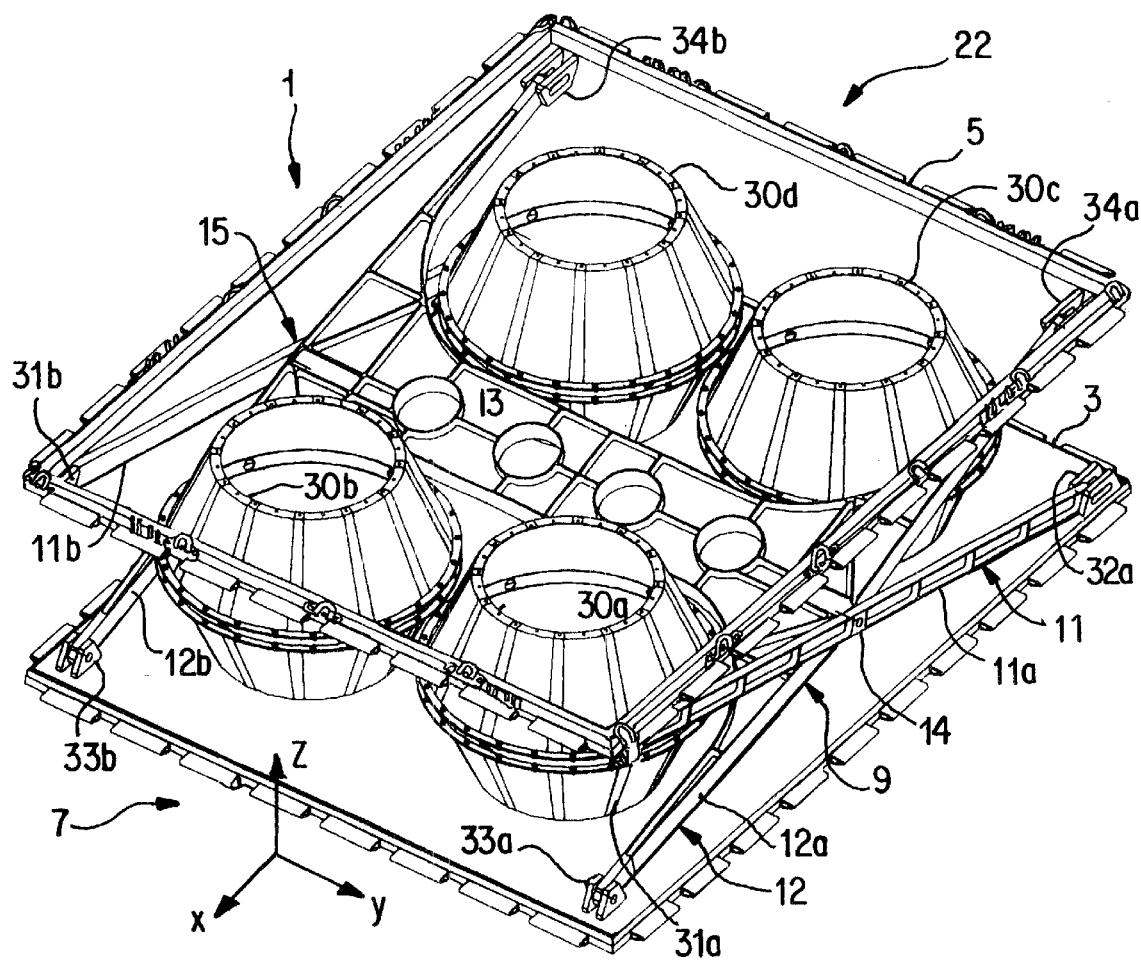
FIG. 1 is a perspective representation of the load depositing platform according to the invention in a moved-apart condition, in which the platform must be shortly before impact on the ground, to ensure a sufficient damping of the carried-along load (the upper plate being shown as transparent)
Figure 2:
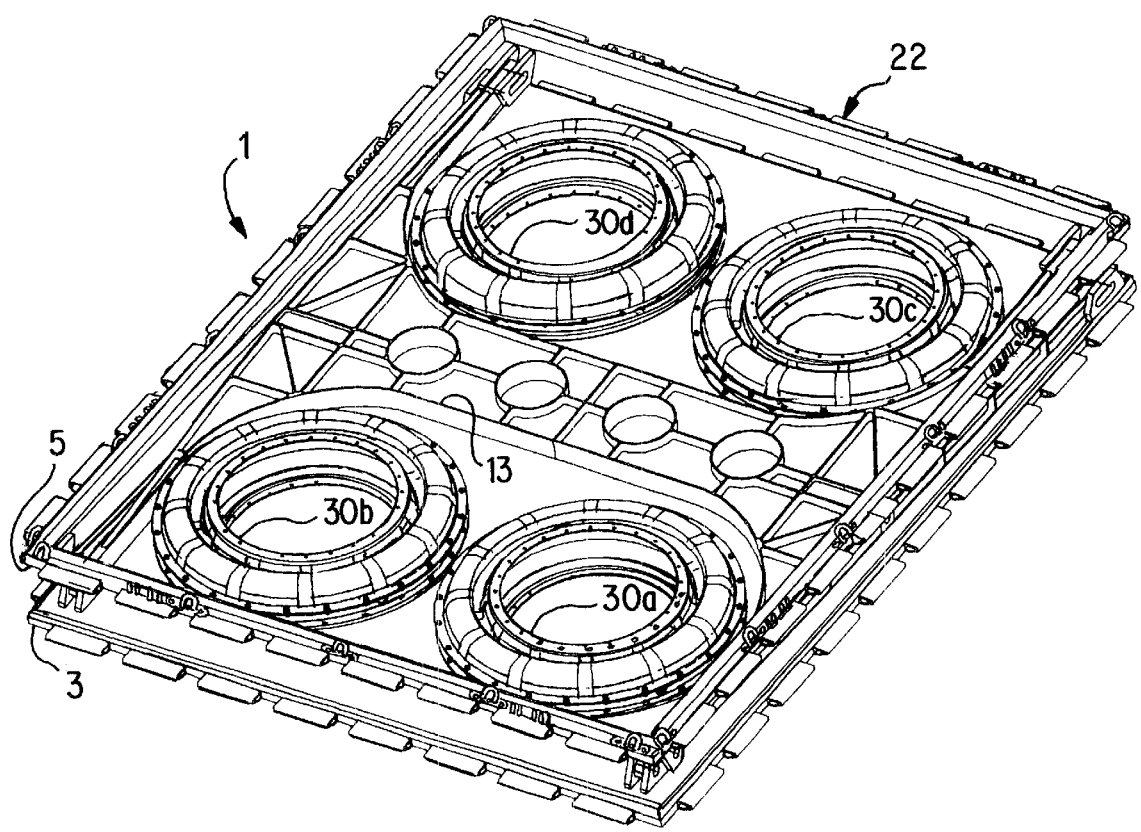
FIG. 2 is a perspective representation of the load depositing platform in its retracted condition, the upper plate being drawn to be transparent.
Figure 3:
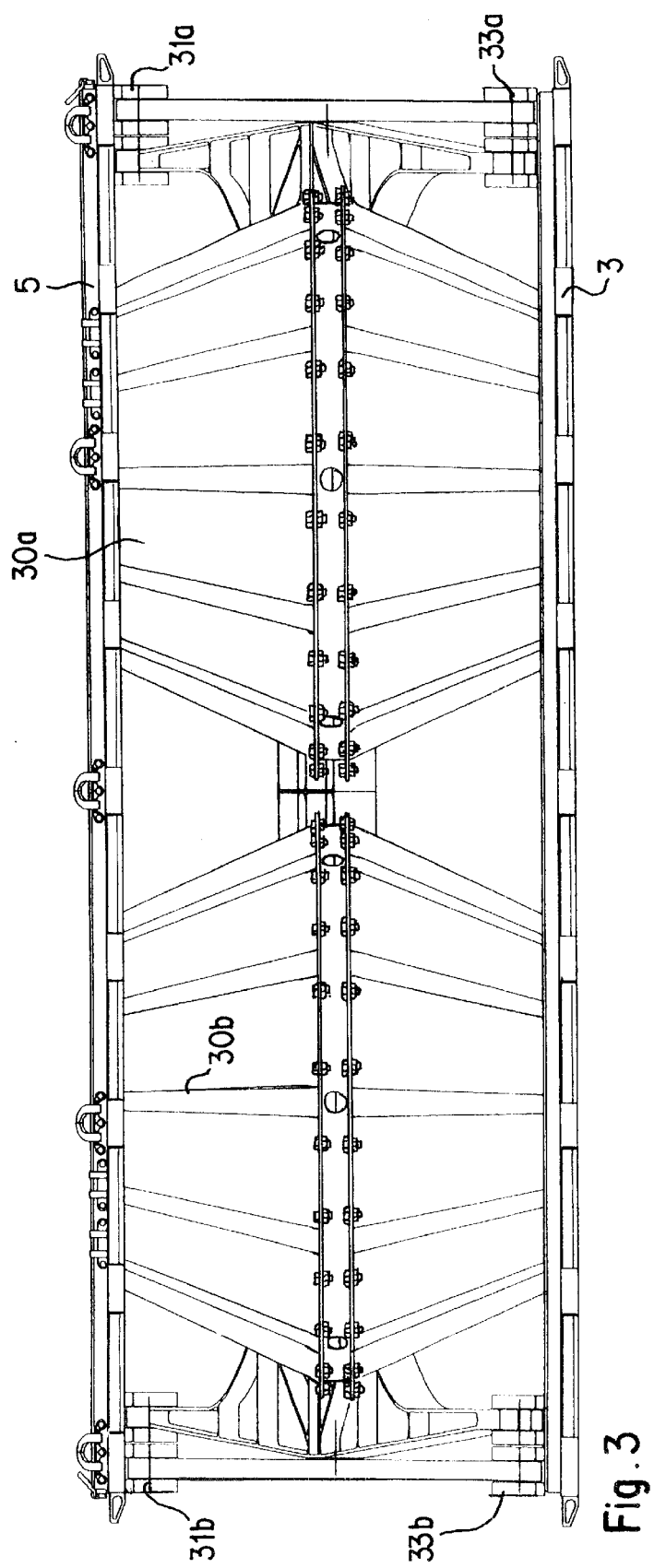
FIG. 3 is a frontal view (X-direction) of the load depositing platform, which is in its extended position of FIG. 1, with a first embodiment of damping elements.
Figure 4:
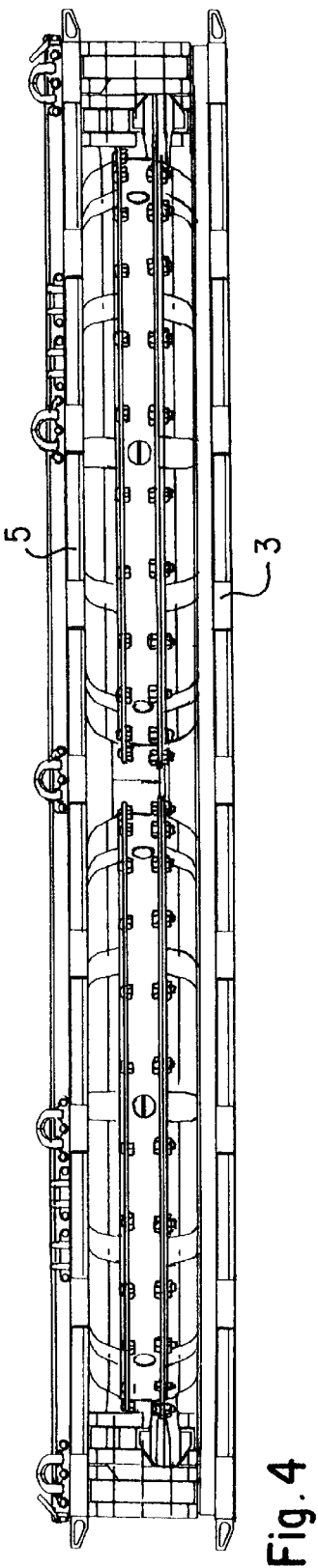
FIG. 4 is a frontal view of the load depositing platform of FIG. 3 in its retracted condition.

The load depositing platform 1 has a lower plate 3 and an upper plate 5. To define the directions used herein, FIG. 1 shows a system of coordinates 7 which defines the X- or longitudinal direction, the Y- or lateral direction and the Z- or vertical direction. A parachute system is fastened in a conventional manner on the upper plate 5, so that, viewed from the upper plate 5, the parachute extended after the drop is in the positive z-direction.

The lower plate 3 and the upper plate 5 are connected in an extendable or retractable manner by way of a scissor-type linkage, which is constructed to absorb shearing forces (forces in the X/Y-plane). As a result, during the impact of the load depositing platform according to the invention, such forces cannot lead to a displacement of the upper plate 5 in the X- or Y-direction relative to the lower plate 3 and a consumption of the entire load depositing platform formation 1 during the landing. The scissor-type linkage 9 is preferably constructed of a first pair of struts 11 having a first strut 11a and a second strut 11b, and a second pair of struts 12 having a first strut 12a and a second strut 12b.

At least one pair of struts 11 or 12 can be reinforced transversely to the movement of the shears by means of a reinforcement 13 (FIG. 1) in order to stabilize the load depositing platform 1 with respect to shearing forces, during impact. The respective first struts 11a, 12a are rotatably connected with the respective second struts 11b and 12b by way of pivot bearings 14, 15 provided in the center. In each case, the two struts of a pair of struts extend parallel to one another; that is, the two struts 11a, 11b and 12a, 12b of each pair of struts 11 and 12 extend on opposite sides of the lower plate 3 and the upper plate 5.

On the forward side 21 of the load depositing platform 1, the ends of the first and second pairs of struts 11,12 are rotatably disposed in pivot bearings 31a, 31b, 33a, 33b on the lower plate 3 and the upper plate 5. On the rearward side 22 of the load depositing platform 1 (situated opposite the forward side 21), the ends of the struts 11a, 11b and 12a, 12b are disposed in links, which are provided in pairs at the ends of the lower and upper plates 3, 5. These links compensate for the change of the length component of the individual struts of the pairs of struts 11, 12 which occurs as a result of the relative Z-displacement of the upper plate 5 to the lower plate 3.

The first strut 11a of the first pair of struts 11 is rotatably disposed by means of its one end in a first pivot bearing 31a on the upper plate 5 and is rotatably as well as, to a limited extent, longitudinally displaceably disposed by means of its other end in the link 32a on the lower plate 3. Analogously, the second strut 11b of the first pair of struts 11 is disposed by means of a bearing 31b on the upper plate 5 and by means of a link 32b (not shown) on the lower plate 3. The first and second struts 12a, 12b of the second pair of struts 12 disposed at one end in respective pivot bearings 33a and 33b on the lower plate 3, while their other ends, are disposed in corresponding links 34a and 34b, to a limited extent, longitudinally displaceably, and rotatably on the upper plate 5. The pivot bearings 31a, 31b, 33a, 33b can be interchanged with the links 32a, 32b, 34a, 34b, as long as the described method of operation is maintained.

As a result of the described scissor-type linkage 9, the lower and upper plates 3,5 are displaceable in a parallel movement toward and away from one another. The scissor-type linkage may also have a different construction according to the prior art, as long as the described method of operation is maintained. For example, the links 32a, 32b, 34a, 34b can be replaced by pivot bearings if the struts of the pairs of struts 11, 12 have a telescope-type construction, such as by means of concussion springs. By virtue of the scissor-type linkages 9, the upper plate 5 and the lower plate 3 cannot be displaced relative to one another in the X/Y-plane. The optional reinforcement 13 provides the scissor-type linkage 9 with additional stability.

The upper plate 5 and the lower plate 3 can move relative to one another only in the Z-direction. Several damper elements 30 are fastened between the upper plate 5 and the lower plate 3. In the described embodiment of FIGS. 1 to 6, a total of 4 damper elements 30a, 30b, 30c, 30d are provided, which are symmetrically arranged between the lower plate 3 and the upper plate 5. In this case, two damper elements 30a, 30b and 30c, 30d respectively are arranged on each side of the reinforcing plate 13.

Each damper element 30 has an upper fastening ring 51 and a lower fastening ring 52 (FIGS. 7–12) which are fastened by means of fastening elements 53 on the upper plate 5 and the lower plate 3. Along the circumference of the upper fastening ring 51 and the lower fastening ring 52, an air-permeable or impermeable woven fabric 35 (in the form of a woven-fabric shell) is fastened, forming an air space between the surfaces of the upper plate 5 and the lower plate 3 bounded by the fastening rings 51, 52. Since the plates 3, 5 can be moved apart, the size of the air space depends on the relative position of the plates 3, 5. In the moved-apart condition of the plates 3, 5, the woven fabric 35 forms a rotationally symmetrical structure. In this case, the fastening rings 51 and 52 are mounted in an almost airtight manner on the upper plate 5 and the lower plate 3.

In the area between the upper fastening ring 51 and the lower fastening ring 52, a passage ring 37 is built into the woven fabric 35. The passage ring 37 has several passage holes 39 which are uniformly distributed along its circumference; when the lower plate 3 and the upper plate 5 move apart, air can flow through holes 39 into the enlarging air space and, when the plates 3, 5 move together, air can escape from the air space.

Figure 11:
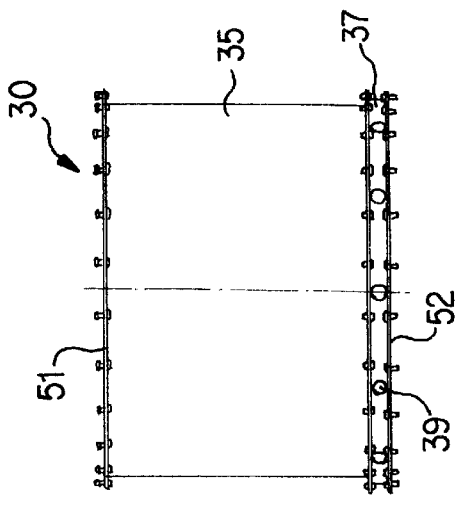
FIG. 11 is a view of a third embodiment of the damping element in its extended condition.
Figure 12:
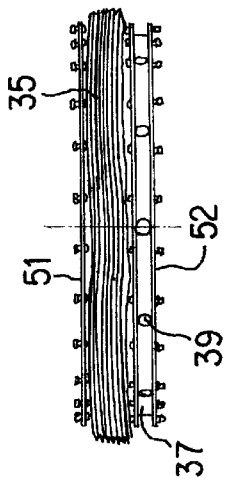
FIG. 12 is a view of the damping element of FIG. 11 in its retracted condition.
Figure 9:
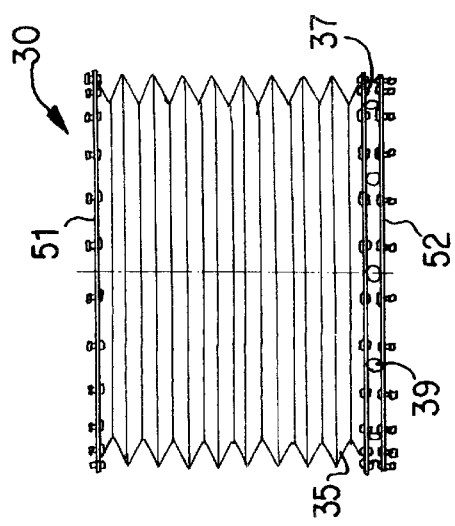
FIG. 9 is a view of a second embodiment of a damping element in its extended condition.
Figure 10:
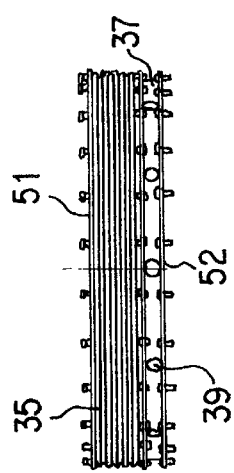
FIG. 10 is a view of the damping element of FIG. 9 in its retracted condition.
Figure 7:
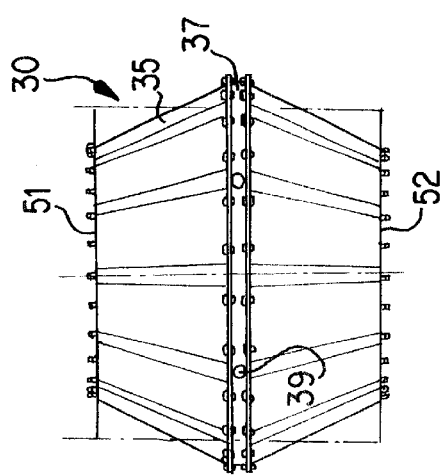
FIG. 7 is a view of a first embodiment of the damping element in the extended condition.
Figure 8:
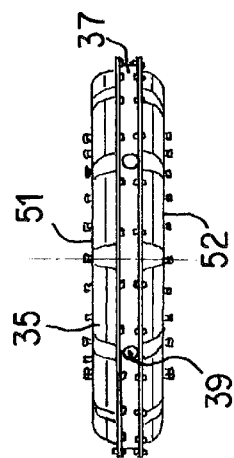
FIG. 8 is a view of the damping element of FIG. 7 in its retracted condition.

The passage ring 37 can be arranged in the center between the upper fastening ring 51 and the lower fastening ring 52 (FIG. 7). As an alternative, the passage ring 37 can also be arranged in the proximity of the upper fastening ring 51 or the lower fastening ring 52 or directly on these. The last alternative is illustrated in FIGS. 9 and 11. However, the at least one passage hole 39 can also be provided in a different manner on the damper element 30, thus not on the passage ring 37, as long as the described function is carried out. The fastening rings 51, 52 may also be eliminated if the woven-fabric shell 35 is directly fastened to the plates 3, 5 (for example, glued on).

The woven fabric 35 according to FIG. 7 is composed of several parts which are vulcanized onto one another in an overlapping manner. The resulting overlapping struts preferably extend in the longitudinal direction (that is, in the direction of the relative movements of the lower plate 3 and the upper plate 5). As a result, a predictable folding behavior can be achieved as in the case of a bellows-type cylinder. However, the folding can also take place as illustrated in FIG. 9. In the extended condition, the woven fabric 35 will then form a so-called bellows-type cylinder. It is a disadvantage of this embodiment that a bellows-type cylinder requires high costs and some of its embodiments are less robust than the compared alternatives of FIGS. 7, 8 and 12, 13. The woven fabric 35 may also have a smooth construction and may be constructed along its height and its circumference in a uniform manner, without folds and in one piece (FIG. 11). The woven fabric according to FIG. 11 requires the lowest expenditures but has an unpredictable folding behavior when the damper elements 30 according to the invention are retracted.

The load depositing platform 1 according to the invention has several fittings 41 on its upper plate 5 in order to fasten or fixedly clamp the load to be deposited (not shown) on the upper plate 5. The fittings 41 can be arranged in the form of lugs and are preferably arranged in a uniform manner along the edges 42 of the upper plate 5. Furthermore, additional fastening devices or lugs can be provided along the side edges 42 of the upper plate 5 for positioning the load depositing platform 1.

The load depositing platform 1 is preferably designed to be coupled with other load depositing platforms of the same construction. For this purpose, corresponding fastening and connecting elements are provided along the edges 42 of the upper plate 5 as well as along the edges 43 of the lower plate 5. FIG. 14 shows the coupling of two load depositing platforms 1 according to the invention.

During operation, the load depositing platform 1 according to the invention is dropped from the aircraft alone or in combination with at least one additional load depositing platform 1 together with the load which is mounted on it and is to be deposited. Within a defined time period or within a defined altitude range, a parachute connected with the upper plate 5 or a parachute system is opened by conventional means. Because a braking force of the parachute or parachutes will then be applied to the upper plate 5 in the positive z-direction, the upper plate 5 and the lower plate 3 are pulled apart. This may also take place only after the unlocking of a locking device (not shown) operating between the lower plate 3 and the upper plate 5. As a result of the pulling-apart of the plates 3, 5, the at least one damper element 30a, 30b, 30c, 30d is also pulled apart, whereby this damper element or these damper elements are filled with air which flows into the at least one damper element through the at least one passage hole 39.

When the depositing platform 1 with the load impacts on the ground, the at least one damper element filled with air causes the required damping of the load since, during this process, air escapes through the at least one passage hole 39. In this case the elasticity of the air as well as the flexibility of the at least one damper element can promote the damping effect. The extent of the damping therefore depends on the extent of the air permeability of the woven fabric 35 as well as on the design of the passage ring 37 and the number of the damper elements 30.

In order to adapt or improve the effect achieved by the damper elements, spring elements, such as gas pressure springs, can be arranged between the lower plate 3 and the upper plate 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A load depositing platform for damping impact forces exerted on a load during a load drop, said platform comprising:
    an upper plate for receiving the load;
    a lower touch-down plate;
    at least one air damper element arranged between the upper plate and the touch-down plate, the at least one air damper element having a shell made of a flexible material which forms an interior space and which is fastened on the upper plate at one extremity and on the touch-down plate at an opposite extremity, and having lateral passage openings, whereby a volume of the interior space changes as a function of relative positioning of the upper plate with respect to the touch-down plate, so that air flows into the interior space when the distance of the plates from one another is increased, and is displaced from the interior space for achieving a damping effect when the plates are pressed together; and
    a scissor-type linkage which connects the upper and lower plates such that they can be moved relative to one another only along a direction toward or away from each other, the upper plate being connected with a parachute which opens during a load drop so that a braking force of the parachute acting upon the upper plate pulls the plates apart.

2. The load depositing platform according to claim 1, wherein the at least one parachute is a self-controlling or a remote-controlled paraglider system.

3. The load depositing platform according to claim 1, wherein the at least one parachute is a round-cap system with at least one parachute.

4. The load depositing platform according to claim 1, wherein:
    the shell of the air damper element is a rotationally symmetrical hollow body, with faces bounded by a woven-fabric; and
    the shell has a passage ring in which the passage openings are provided.

5. The load depositing platform according to claim 4, wherein:
    the woven-fabric shell is fastened on the upper and on lower plates by respective upper and lower fastening rings;
    the woven fabric is formed of parts which are vulcanized to and overlap one another in order to achieve, during a compression of the damper element, a predefined folding-together of the woven fabric; and
    the passage ring is arranged bewteen the upper fastening ring and the lower fastening ring.

6. The load depositing platform according to claim 1, wherein:
    the woven-fabric shell is fastened on the upper and lower plates by means of respective fastening rings and is constructed uniformly along a circumference and height of the damper element; and
    the passage ring is arranged beside a first one of the fastening rings.

7. The load depositing platform according to claim 6, wherein another passage ring is provided on a second one of the fastening rings.

8. The load depositing platform according to claim 1 wherein the damper element is constructed as a bellows-type cylinder.

9. The load depositing platform according to claim 1, wherein at least one of the upper and lower plates is provided with fastening devices on at least one of its side edges for fastening another load depositing platform thereto.

10. A shock absorbing platform for absorbing impact forces exerted on a load mounted on the platform, comprising:
    an upper plate for supporting the load;
    a lower plate disposed parallel to the upper plate;
    a scissor linkage coupling the upper plate to the lower plate and confining relative motion of the upper and lower plates to a movement axis perpendicular thereto, whereby the upper and lower plates can move only toward or away from each other; and
    at least one damper element connected between the upper and lower plates, said damper comprising an outer shell made of a flexible material that encloses an interior space, with a passage hole for regulating air flow into and out of the interior space.

11. A shock absorbing platform for absorbing impact forces exerted on a load mounted on the platform according to claim 10, wherein said scissor linkage comprises first and second pairs of struts, two such struts being pivotably connected to each of opposite edges of the upper and lower plates, a first end of each strut being pivotally coupled to one of the upper and lower plates and a second end of each strut being translatably coupled to one of the upper and lower plates.

12. A shock absorbing platform for absorbing impact forces exerted on a load mounted on the platform according to claim 10, wherein said upper plate is connectable to a parachute, whereby deceleration forces exerted by the parachute during operation act on the upper plate.

* * * * *